US012700542B2

(12) United States Patent
Park et al.

(10) Patent No.: US 12,700,542 B2
(45) Date of Patent: Aug. 4, 2026

(54) MULTILAYER ELECTRONIC COMPONENT

(71) Applicant: SAMSUNG ELECTRO-MECHANICS CO., LTD., Suwon-si (KR)

(72) Inventors: Yong Park, Suwon-si (KR); Jong Ho Lee, Suwon-si (KR); Jung Jin Park, Suwon-si (KR); Su Min Kim, Suwon-si (KR); Eun Jung Lee, Suwon-si (KR); Yong Min Hong, Suwon-si (KR); Ji Hyeon Lee, Suwon-si (KR); Sim Chung Kang, Suwon-si (KR); Min Woo Kim, Suwon-si (KR); Jung Tae Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 522 days.

(21) Appl. No.: 18/137,500

(22) Filed: Apr. 21, 2023

(65) Prior Publication Data

US 2024/0203651 A1  Jun. 20, 2024

(30) Foreign Application Priority Data

Dec. 14, 2022  (KR) ........................ 10-2022-0175001

(51) Int. Cl.
*H01G 4/12*  (2006.01)
*H01G 4/30*  (2006.01)

(52) U.S. Cl.
CPC ............. *H01G 4/1227* (2013.01); *H01G 4/30* (2013.01)

(58) Field of Classification Search
CPC ........ H01G 4/30; H01G 4/1227; H01G 4/012; H01G 4/12
USPC ..... 361/301.4, 311, 321.1, 321.4, 321.5, 312
See application file for complete search history.

(56) References Cited

FOREIGN PATENT DOCUMENTS

CN        111939317 A    *  11/2020   ............. A61L 27/54
CN        112778744 A    *  5/2021    ............... H01G 4/12

OTHER PUBLICATIONS

Yong Park, "Mussel-inspired ceramic layer for enhancement of mechanical properties", http://library.kaist.ac.kr/search/detail/view. do?bibCtrlNo=963534&flag=dissertation, MS-Theses_Master, 2021.

* cited by examiner

*Primary Examiner* — Arun Ramaswamy
(74) *Attorney, Agent, or Firm* — MORGAN, LEWIS & BOCKIUS LLP

(57) ABSTRACT

A multilayer electronic component includes a body including a dielectric layer and internal electrodes alternately disposed with the dielectric layer; and external electrodes disposed on the body. The dielectric layer includes N-doped polydopamine.

17 Claims, 9 Drawing Sheets

FIRST
DIRECTION

SECOND
DIRECTION

I – I'

FIRST
DIRECTION

THIRD
DIRECTION

II – II'

Dopamine hydrochloride

FIG. 5A

Polydopamine

FIG. 5B

N-doped Polydopamine

FIG. 5C

MULTILAYER ELECTRONIC COMPONENT

CROSS-REFERENCE TO RELATED APPLICATION(S)

This application claims benefit of priority to Korean Patent Application No. 10-2022-0175001 filed on Dec. 14, 2022 in the Korean Intellectual Properties Office, the disclosure of which is incorporated herein by reference in its entirety.

TECHNICAL FIELD

The present disclosure relates to a multilayer electronic component.

BACKGROUND

A multilayer ceramic capacitor (MLCC), a multilayer electronic component, may be a passive device which may constantly control a current to flow in a circuit, and a multilayer ceramic capacitor may be widely used for mobile phones, personal computers and electric vehicles, and may be important in the electronics industry, similarly to semiconductors. In response to miniaturization and multifunctionalization in the electronics industry, a multilayer ceramic capacitor has also been designed to have an ultra-small size and ultra-high-capacitance. Accordingly, it has been necessary to reduce a thickness of a dielectric layer included in the multilayer ceramic capacitor.

The reduction in a thickness of the dielectric layer may, however, degrade mechanical properties of a multilayer ceramic capacitor, thereby causing cracks and delamination or deteriorating moisture resistance and high-temperature reliability. Accordingly, it may be necessary to research a method for improving strength, toughness, and adhesion between dielectric layers so as to prevent deterioration of mechanical properties of a multilayer ceramic capacitor.

SUMMARY

An example embodiment of the present disclosure is to reduce stress applied to a dielectric layer by heat and pressure applied in a process of compressing and laminating a multilayer electronic component.

An example embodiment of the present disclosure is to reduce deformation of a multilayer electronic component by external environment.

An example embodiment of the present disclosure is to protect a capacitance forming portion of a multilayer electronic component from cracks occurring when mounting a multilayer electronic component.

According to an example embodiment of the present disclosure, a multilayer electronic component includes a body including a dielectric layer and internal electrodes alternately disposed with the dielectric layer; and external electrodes disposed on the body. The dielectric layer includes N-doped polydopamine.

According to another example embodiment of the present disclosure, a multilayer electronic component includes a body comprising a dielectric layer and first and second internal electrodes with the dielectric layer therebetween in a first direction, including first and second surfaces opposing in the first direction, third and fourth surfaces connected to the first and second surfaces and opposing in a second direction, and fifth and sixth surfaces connected to the first to fourth surfaces and opposing in a third direction, and further comprising a capacitance forming portion in which the first and second internal electrodes overlap each other in the first direction and form capacitance, and a margin portion disposed on one surface and the other surface of the capacitance forming portion in the third direction; and first and second external electrodes disposed on the body to connect to the first and second internal electrodes, respectively. The margin portion includes polydopamine.

BRIEF DESCRIPTION OF DRAWINGS

The above and other aspects, features, and advantages of the present disclosure will be more clearly understood from the following detailed description, taken in combination with the accompanying drawings, in which:

FIGS. 5A-5C show diagrams illustrating a process of forming N-doped polydopamine according to an example embodiment of the present disclosure;

DETAILED DESCRIPTION

Figure 1:
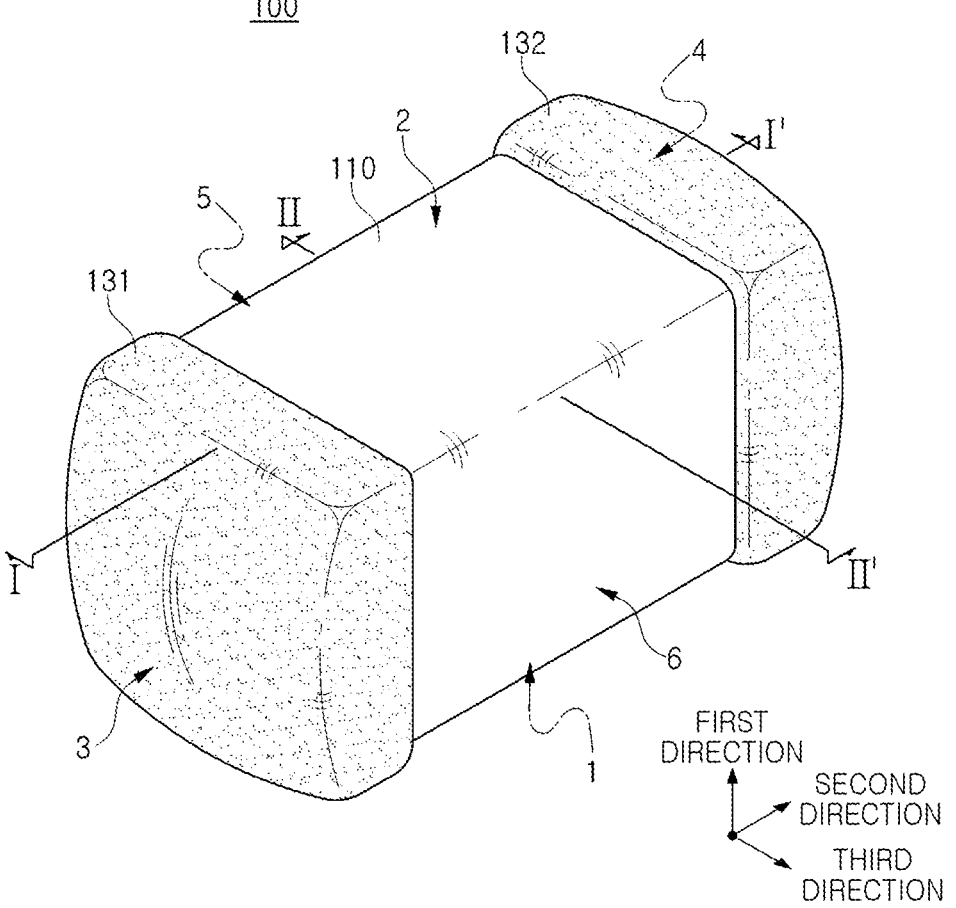
FIG. 1 is a perspective diagram illustrating a multilayer electronic component according to an example embodiment of the present disclosure.

Hereinafter, example embodiments of the present disclosure will be described below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after a gaining an understanding of the disclosure of this application.

In the drawings, same elements will be indicated by the same reference numerals. Also, redundant descriptions and detailed descriptions of known functions and elements which may unnecessarily render the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a direction in which first and second internal electrodes are alternately disposed with a dielectric layer interposed therebetween or a thickness T direction, among second and third directions perpendicular to the first direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
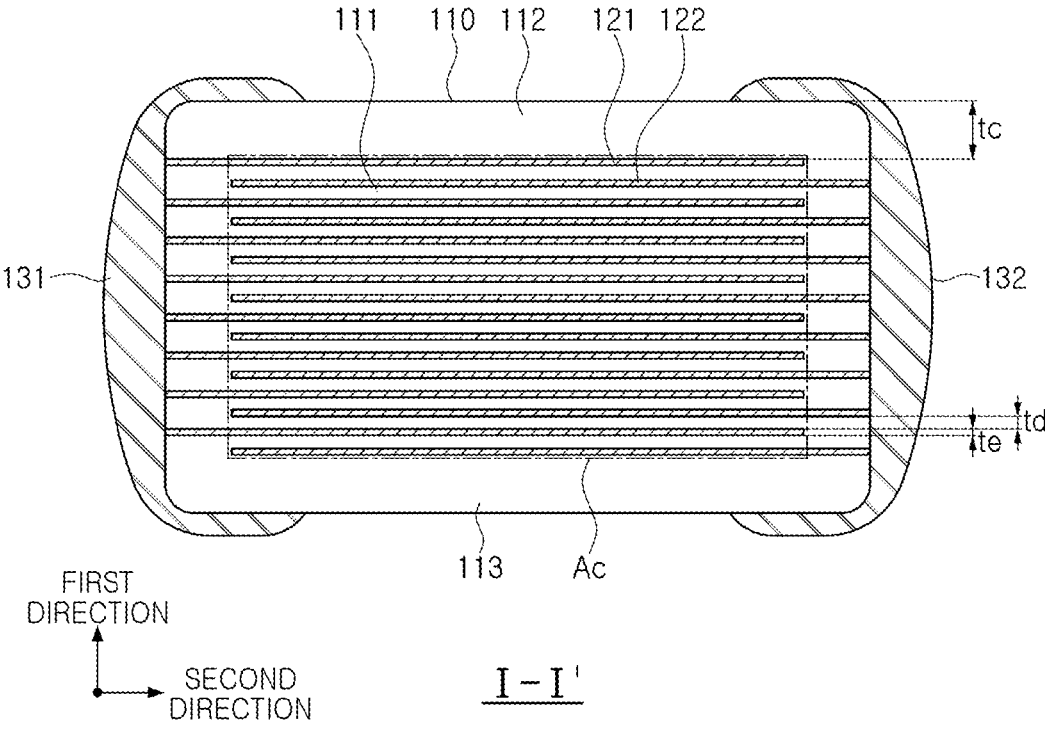
FIG. 2 is a cross-sectional diagram taken along line I-I' in FIG. 1.

FIG. 2 is a cross-sectional diagram taken along line I-I' in FIG. 1.

Figure 3:
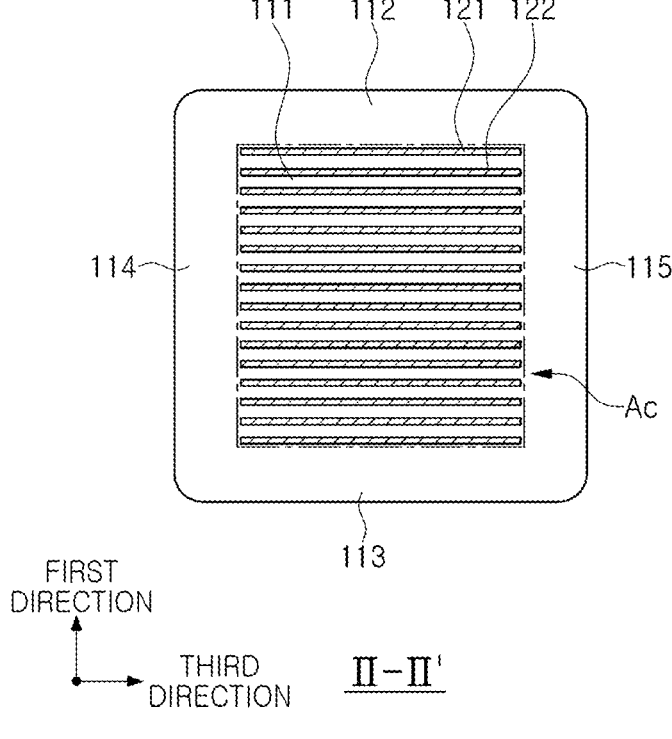
FIG. 3 is a cross-sectional diagram taken along line II-II' in FIG. 1.

FIG. 3 is a cross-sectional diagram taken along line II-II' in FIG. 1.

Figure 4:
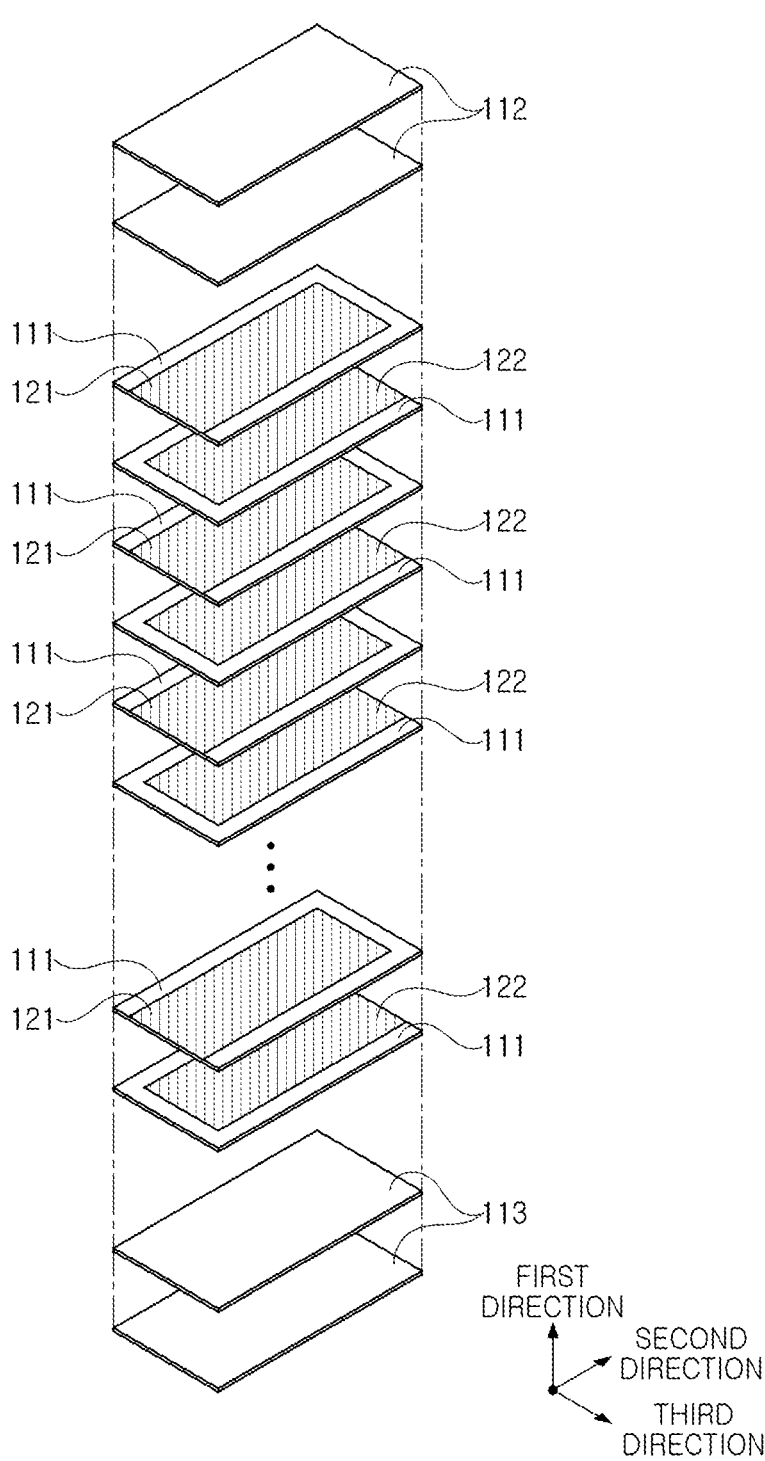
FIG. 4 is an exploded perspective diagram illustrating a body according to an example embodiment of the present disclosure.

FIG. 4 is an exploded perspective diagram illustrating a body according to an example embodiment.

FIG. 5 is a diagram illustrating a process of forming N-doped polydopamine according to an example embodiment.

Figure 6A:
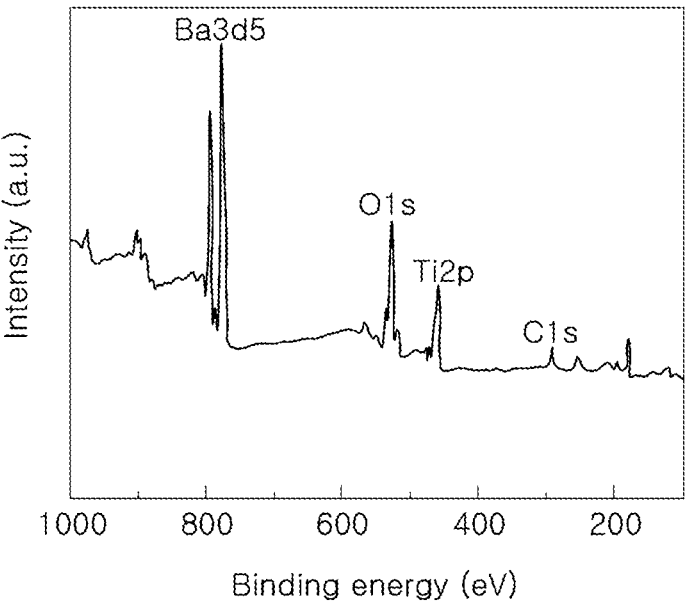
FIG. 6A is a two-axis graph illustrating a relationship between binding energy and spectral intensity by XPS analysis of a dielectric layer according to a comparative example.
Figure 6B:
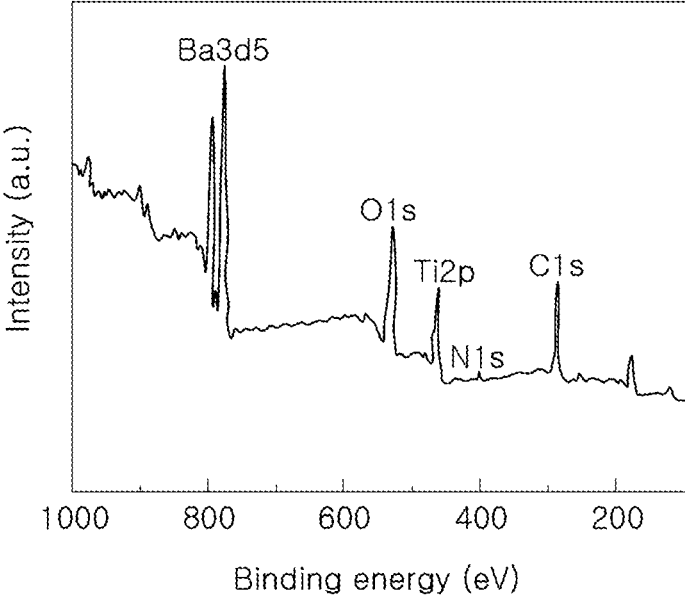
FIG. 6B is a two-axis graph illustrating a relationship between binding energy and spectral intensity by XPS analysis of a dielectric layer in an example embodiment.

FIG. 6A is a two-axis graph illustrating a relationship between binding energy and spectral intensity by XPS analysis of a dielectric layer according to a comparative example. FIG. 6B is a two-axis graph illustrating a relationship between binding energy and spectral intensity by XPS analysis of a dielectric layer in an example embodiment.

Figure 7A:
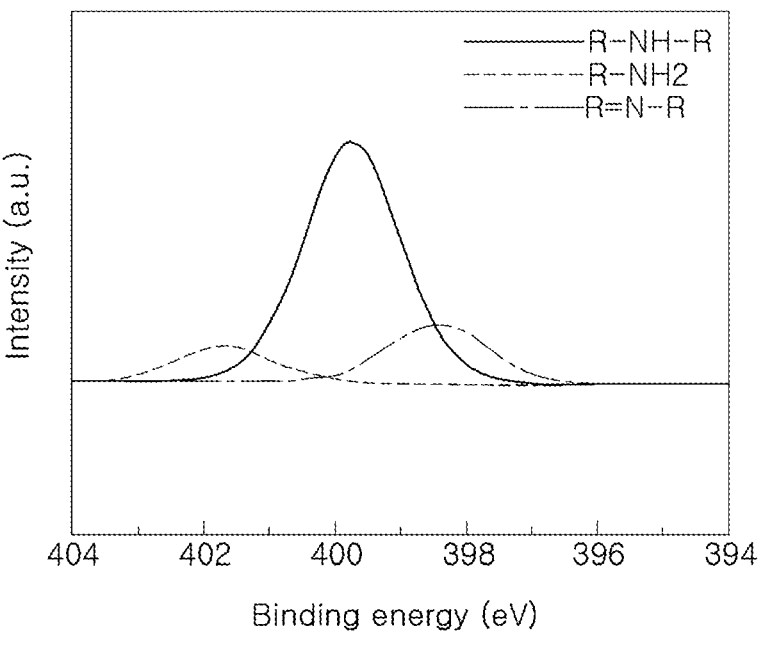
FIG. 7A is a graph illustrating a result of analysis of deconvolution of an N1s peak in FIG. 6B.
Figure 7B:
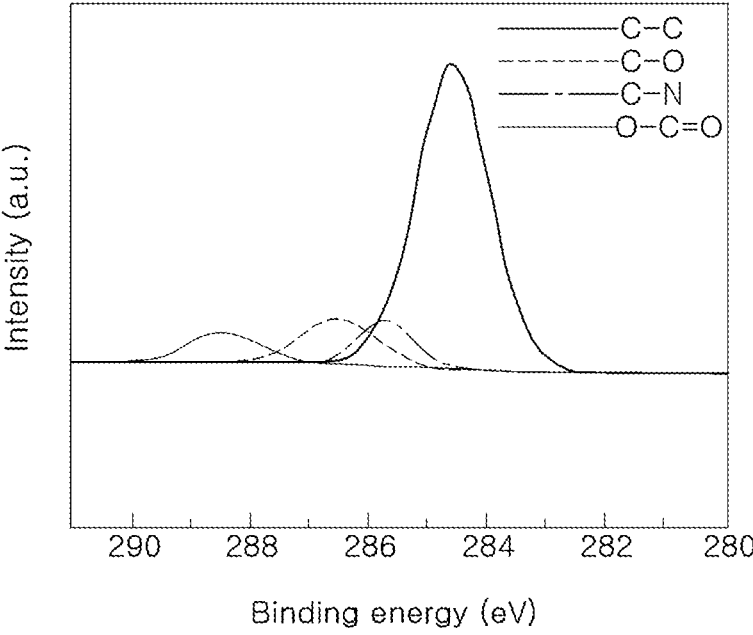
FIG. 7B is a graph illustrating a result of analysis of deconvolution of a C1s peak in FIG. 6B.

FIG. 7A is a graph illustrating a result of analysis of deconvolution of an N1s peak in FIG. 6B. FIG. 7B is a graph illustrating a result of analysis of deconvolution of an C1s peak in FIG. 6B.

Figure 8A:
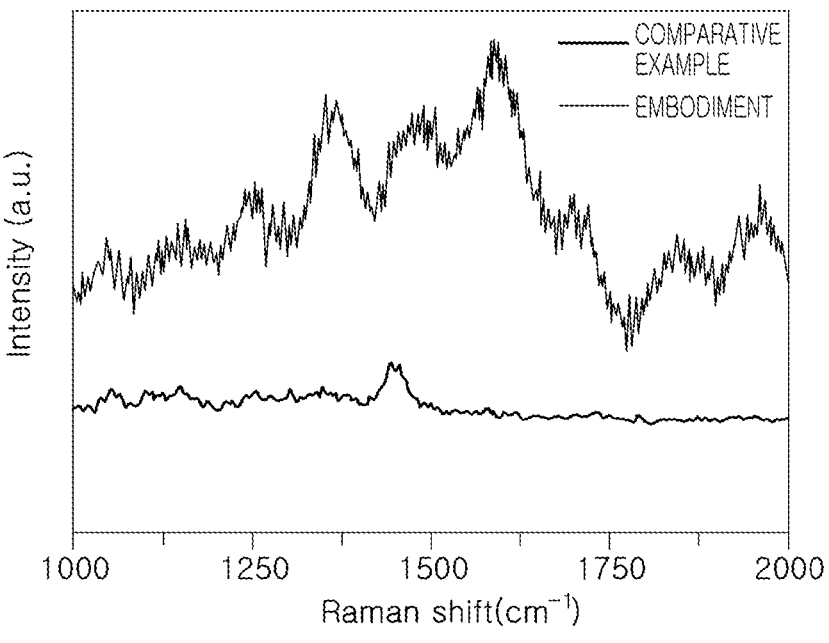
FIG. 8A is a two-axis graph illustrating a relationship line between spectral intensity and a wave number by Raman spectrum analysis in a state before firing of a dielectric layer.
Figure 8B:
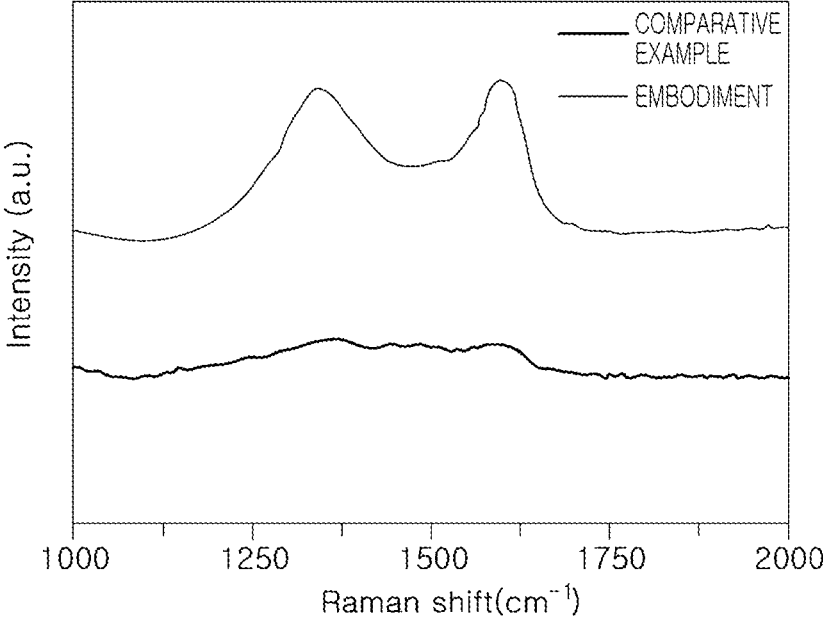
FIG. 8B is a two-axis graph illustrating a relation line between spectral intensity and a wave number by Raman spectrum analysis in a state after firing a dielectric layer.

FIG. 8A is a two-axis graph illustrating a relationship line between spectral intensity and a wave number by Raman spectrum analysis in a state before firing of a dielectric layer. FIG. 8B is a two-axis graph illustrating a relation line between spectral intensity and a wave number by Raman spectrum analysis in a state after firing a dielectric layer.

Figure 9A:
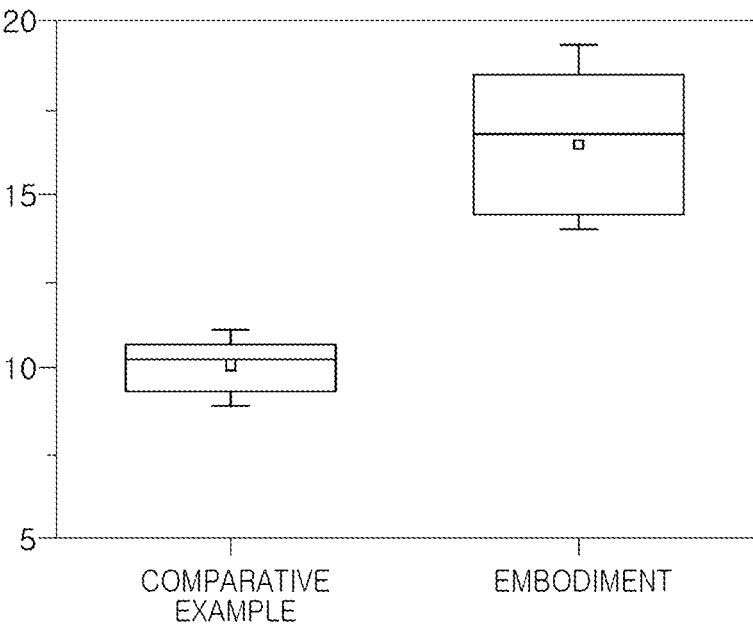
FIG. 9A is a graph illustrating result of comparing adhesive forces of a dielectric layer according to a comparative example and an embodiment.
Figure 9B:
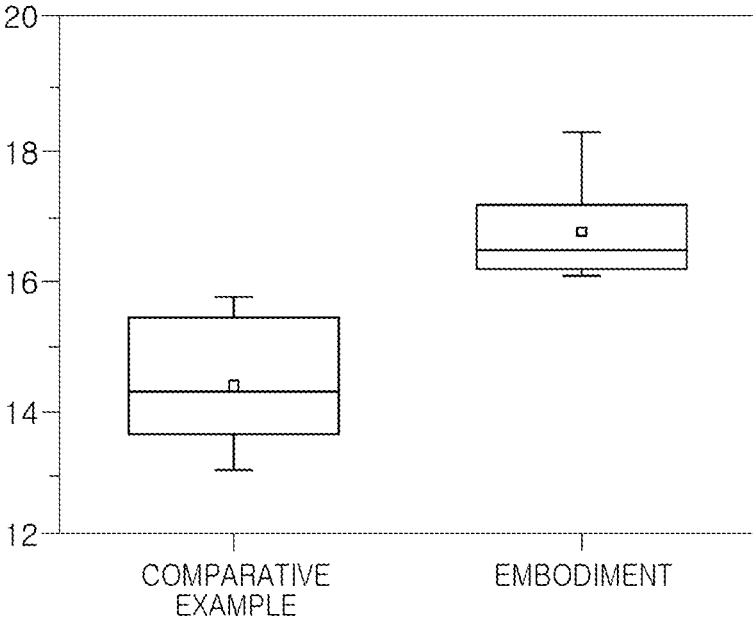
FIG. 9B is a graph illustrating results of comparing an elastic modulus of a dielectric layer according to a comparative example and an embodiment.

FIG. 9A is a graph illustrating result of comparing adhesive forces of a dielectric layer according to a comparative example and an embodiment. FIG. 9B is a graph illustrating results of comparing an elastic modulus of a dielectric layer according to a comparative example and an embodiment.

Figure 10:
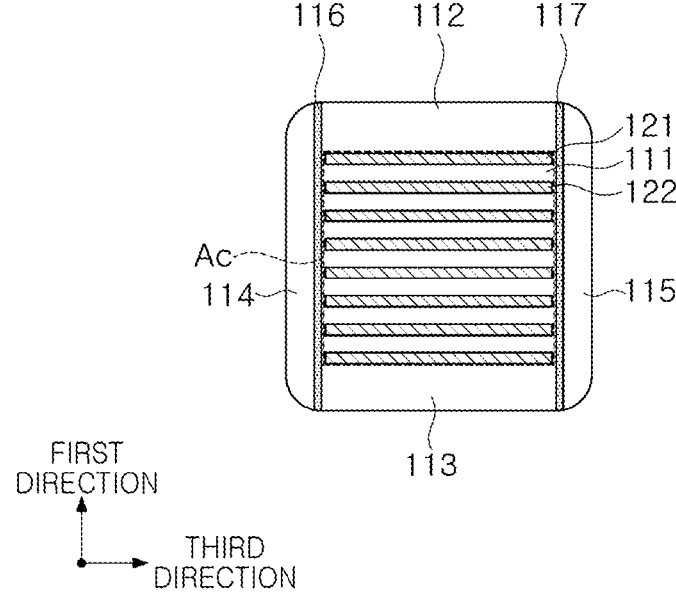
FIG. 10 is a cross-sectional diagram illustrating a multilayer electronic component taken in first and third directions according to an example embodiment of the present disclosure.

FIG. 10 is a cross-sectional diagram illustrating a multilayer electronic component taken in first and third directions according to an example embodiment.

Hereinafter, referring to FIGS. 1 to 10, a multilayer electronic component 100 according to an example embodiment will be described in detail.

In the body 110, the dielectric layers 111 and internal electrodes 121 and 122 may be alternately laminated.

The shape of the body 110 may not be limited to any particular shape, but as illustrated, the body 110 may have a hexahedral shape or a shape similar to a hexahedral shape.

Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

In an example embodiment, a raw material for forming the dielectric layer 111 is not limited to any particular example as long as sufficient capacitance may be obtained. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ $(0<x<1)$, $Ba(Ti_{1-y}Ca_y)O_3$ $(0<y<1)$, $(Ba_{1-x}Ca_x)$ $(Ti_{1-y}Zr_y)O_3$ $(0<x<1, 0<y<1)$ or $Ba(Ti_{1-y}Zr_y)O_3$ $(0<y<1)$ in which Ca (calcium), Zr (zirconium) is partially solid-solute. That is, the dielectric layer 111 may include an oxide including Ba and Ti.

Also, various ceramic additives, organic solvents, binders, dispersants, or the like, may be added to a raw material for forming the dielectric layer 111 in the example embodiment to powder such as barium titanate ($BaTiO_3$).

As an example of including the dielectric layer 111 including N-doped polydopamine as in the example embodiment, a method of forming the dielectric layer 111 using barium titanate-based powder coated with polydopamine may be used.

The average thickness td of the dielectric layer 111 may not be limited to any particular example. For example, the average thickness td of the dielectric layer 111 may be 0.2 μm or more and 2 μm or less.

When the dielectric layer is formed to have a thickness of less than 0.6 μm, in particular, when the thickness of the dielectric layer is 0.35 μm or less, reliability of the multilayer electronic component 100 may be deteriorated.

In an example embodiment, since the dielectric layer 111 may include N-doped polydopamine, reliability of the multilayer electronic component 100 may be secured even when the average thickness td of the dielectric layer 111 is 0.35 μm or less. That is, when the average thickness td of the dielectric layer 111 is 0.35 μm or less, the effect of improvement in reliability in the example embodiment may be remarkable.

Here, the average thickness td of the dielectric layer 111 may refer to an average thickness of the dielectric layer 111 disposed between the first and second internal electrodes 121 and 122.

The average thickness of the dielectric layer 111 may be measured by scanning a cross-section of the body 110 in the length and thickness directions (L-T) using a scanning electron microscope (SEM) with a magnification of 10,000. More specifically, an average value may be measured from the thicknesses of the dielectric layer 111 at 30 points spaced apart by an equal distance in the length direction in the scanned image. The 30 points at equal distances may be designated in the active portion Ac. Also, when the average value is measured by extending the measurement of the average value to ten dielectric layers 111, the average thickness of the dielectric layer 111 in the first direction may be further generalized.

The body 110 may include a capacitance forming portion Ac disposed in the body 110 and forming capacitance including the first internal electrode 121 and the second internal electrode 122 alternately disposed with the dielectric layer 111 interposed therebetween, and cover portions 112 and 113 formed on upper and lower portions of the capacitance forming portion Ac in the first direction.

The capacitance forming portion Ac may contribute to capacitance formation of a capacitor, and may be formed by repeatedly laminating a plurality of first and second internal electrodes 121 and 122 with a dielectric layer 111 interposed therebetween.

In an example embodiment, an upper cover portion 112 may be disposed on one surface of the capacitance forming portion Ac in the first direction, and a lower cover portion 113 may be included on the other surface of the capacitance forming portion Ac in the first direction.

The upper cover portion 112 and the lower cover portion 113 may be formed by laminating a single dielectric layer or two or more dielectric layers on the upper and lower surfaces of the capacitance forming portion Ac in the thickness direction, respectively, and may prevent damages to the internal electrode due to physical or chemical stress.

The upper cover portion 112 and the lower cover portion 113 may not include internal electrodes and may include the same material as that of the dielectric layer 111.

That is, the upper cover portion 112 and the lower cover portion 113 may include a ceramic material, for example, a barium titanate ($BaTiO_3$) ceramic material.

The average thickness of the cover portion 112 and 113 may not be limited to any particular example. However, to easily obtain miniaturization and high capacitance of the multilayer electronic component, the average thickness tc of the cover portions 112 and 113 may be 15 μm or less.

The average thickness of the cover portion 112 and 113 may refer to the size in the first direction, and may be a value obtained by averaging the size of the cover portion 112 and 113 in the first direction measured at 5 points spaced apart by an equal distance in the upper or lower portions of the capacitance forming portion Ac.

In an example embodiment, margin portions 114 and 115 may be disposed on one surface and the other surface of the capacitance forming portion Ac in the third direction.

The margin portions 114 and 115 may include a margin portion 114 disposed on the fifth surface 5 and a margin portion 115 disposed on the sixth surface 6 of the body 110. That is, the margin portions 114 and 115 may be disposed on both end surfaces of the body 110 in the third direction (width direction).

As illustrated in FIG. 3, the margin portions 114 and 115 may refer to a region between both ends of the first and second internal electrodes 121 and 122 and the boundary surface of the body 110 in a cross-section of the body 110 taken in the width-thickness (W-T) direction.

The margin portions 114 and 115 may prevent damages to the internal electrode due to physical or chemical stress.

The margin portions 114 and 115 may be formed by forming internal electrodes by applying a conductive paste on the ceramic green sheet other than the region in which the margin portions are formed.

Also, to prevent a step difference due to the internal electrodes 121 and 122, after laminating, the internal electrodes may be cut out to be exposed to the fifth and sixth surfaces 5 and 6 of the body, a single dielectric layer or two or more dielectric layers may be laminated on both side surfaces of the capacitance forming portion Ac in the third direction (width direction), thereby forming the margin portions 114 and 115. Accordingly, in a multilayer electronic component in an example embodiment, the body 110 may have a structure including margin portions 114 and 115 disposed on one surface of the capacitance forming portion Ac in the third direction.

The width of the margin portion 114 and 115 may not be limited to any particular example. However, the average width of the margin portions 114 and 115 may be 15 μm or less to easily obtain miniaturization and high capacitance of the multilayer electronic component.

The average width of the margin portion 114 and 115 may refer to the average size of the margin portion 114 and 115 in the third direction, and may be a value obtained by averaging the size of the margin portion 114 and 115 in the third direction measured at 5 points spaced apart by an equal distance on the side of the capacitance forming portion Ac.

The internal electrodes 121 and 122 may be alternately laminated with the dielectric layer 111.

The internal electrodes 121 and 122 may include a first internal electrode 121 and a second internal electrode 122. The first and second internal electrodes 121 and 122 may be alternately disposed to oppose each other with the dielectric layer 111 included in the body 110 interposed therebetween, and may be connected to the third and fourth surfaces 3 and 4 of the body 110, respectively. Specifically, one end of the first internal electrode 121 may be connected to the third surface 3, and one end of the second internal electrode 122 may be connected to the fourth surface 4. That is, in an example embodiment, the internal electrodes 121 and 122 may be in contact with the third surface 3 or the fourth surface 4.

The first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. Accordingly, the first internal electrode 121 may be formed to be spaced apart from the fourth surface 4 by a predetermined distance, and the second internal electrode 122 may be formed to be spaced apart from the third surface 3 by a predetermined distance. In this case, the first and second internal electrodes 121 and 122 may be electrically separated from each other by the dielectric layer 111 disposed therebetween.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

The average thickness te of the internal electrodes 121 and 122 may not need to be limited to any particular example. For example, the average thickness te of the internal electrodes 121 and 122 may be 0.2 μm or more and 2 μm or less.

However, when the internal electrode is formed to have a thickness of less than 0.6 μm, particularly when the thickness of the internal electrode is 0.35 μm or less, reliability of the multilayer electronic component 100 may be problematic.

In the example embodiment, since the dielectric layer 111 may include N-doped polydopamine, reliability may be improved even when the average thickness te of the internal electrodes 121 and 122 is 0.35 μm or less. Accordingly, when the average thickness of the internal electrodes 121 and 122 is 0.35 μm or less, the effect in the example may be remarkable, and miniaturization and high capacitance of the multilayer electronic component may be easily obtained.

The average thickness te of the internal electrodes 121 and 122 may refer to the average thickness te of the internal electrodes 121 and 122. The average thickness of the internal electrodes 121 and 122 may be measured by scanning a cross-section of the body 110 in the length and thickness direction (L-T) using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized.

The external electrodes 131 and 132 may be disposed on the body 110. Specifically, the external electrodes 131 and 132 may include the first and second external electrodes 131 and 132 disposed on the third and fourth surfaces 3 and 4 of the body 110, respectively, and connected to the first and second internal electrodes 121 and 122, respectively.

In the example embodiment, the multilayer electronic component 100 may have two external electrodes 131 and 132, but the number and shape of the external electrodes 131 and 132 may be varied depending on the internal electrodes 121 and 122 or for other purposes.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers disposed on the body 110 and plating layers disposed on the electrode layers.

For a more specific example of the electrode layers, the electrode layers may be sintered electrodes including a first conductive metal and glass, or a resin-based electrode including a conductive metal and resin.

Also, the electrode layers may have a form in which a plastic electrode and a resin-based electrode are formed in order on the body. Also, the electrode layers may be formed by transferring a sheet including a conductive metal onto a body or by transferring a sheet including a conductive metal onto a fired electrode.

A material having excellent electrical conductivity may be used as the conductive metal included in the electrode layers. For example, the conductive metal may be at least one of nickel (Ni), copper (Cu), and alloys thereof, and may be copper (Cu) to improve adhesion to the body preferably.

The plating layers may improve mounting properties. The type of the plating layers is not limited to any particular example, and a plating layer including at least one of Ni, Sn, Pd, and alloys thereof, or may include a plurality of layers.

For a more specific example of the plating layers 131c and 132c, the plating layers may be Ni plating layers or Sn plating layers, and Ni plating layers and Sn plating layers may be formed in order on the electrode layers, and a Sn plating layer, a Ni plating layer, and a Sn plating layer may be formed in order. Also, the plating layers may include a plurality of Ni plating layers and/or a plurality of Sn plating layers.

The size of the multilayer electronic component 100 in an example embodiment is not limited to any particular example.

However, to obtain both miniaturization and high capacitance, the thickness of the dielectric layer and the internal electrode may need to be reduced to increase the number of layers. Accordingly, the effect of the example embodiment may be excellent in a multilayer electronic component 100 having a size of 0603 (length×width, 0.6 mm×0.3 mm) or less.

Accordingly, considering manufacturing errors, when the length of the multilayer electronic component 100 is 0.66 mm or less and the width is 0.33 mm or less, external electrode sizes, the effect of improvement in reliability in the example embodiment may be remarkable. Here, the length of the multilayer electronic component 100 may refer to the maximum size of the multilayer electronic component 100 in the second direction, and the width of the multilayer electronic component 100 may refer to the maximum size of the multilayer electronic component 100 in the third direction.

In an example embodiment, the dielectric layer 111 may include N-doped Polydopamine.

Polydopamine may be one of adhesive proteins and may include a catechol group and an amine group. Polydopamine may be formed by polymerizing dopamine precursors at pH 8.5, and may be easily applied through self-polymerization. When polydopamine is included in the dielectric layer 111, polydopamine may improve adhesion between dielectric layers adjacent to each other.

Figures 5A, 5B, 5C:
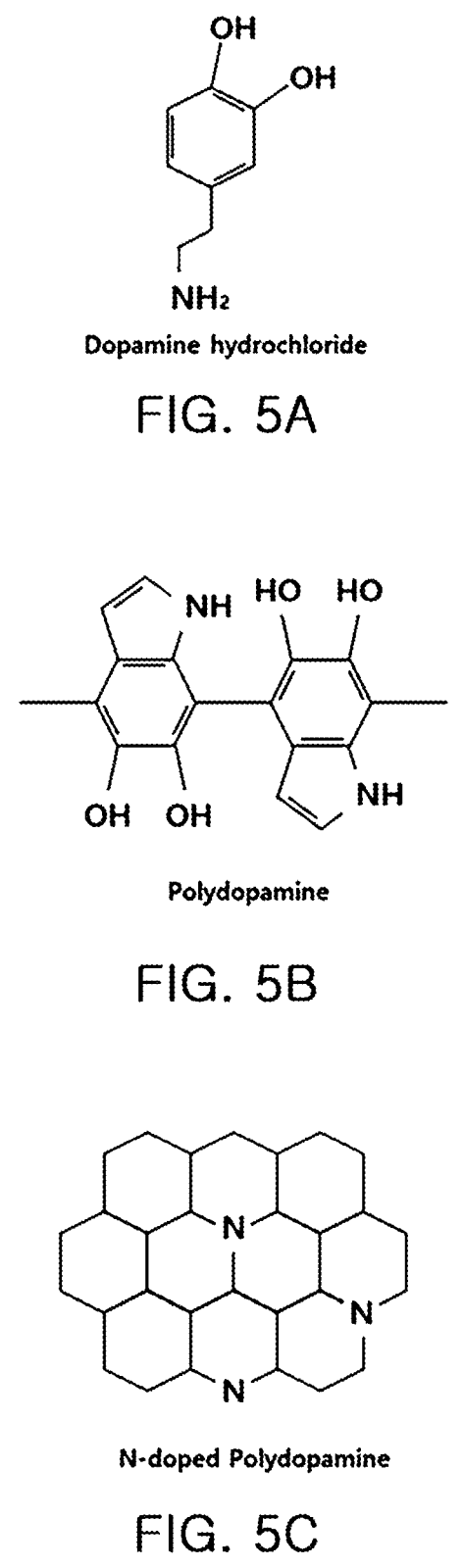

As illustrated in FIGS. 5A-5C, to form the dielectric layer 111 including N-doped polydopamine in an example embodiment, dopamine hydrochloride may be added to the ceramic green sheet for dielectric formation. Dopamine hydrochloride added to the ceramic green sheet for dielectric formation may form a polydopamine polymer through self-polymerization. Thereafter while going through a firing process to form the body 110 of the multilayer electronic component, a portion of the polydopamine polymer may be formed as N-doped polydopamine, and N-doped polydopamine may be included in the dielectric layer 111 in an example embodiment.

When the dielectric layer 111 includes N-doped polydopamine as in an example embodiment, adhesive force between the dielectric layers 111 may be improved, and by improving the elastic modulus of the dielectric layer 111, residual stress applied during compression and lamination of the multilayer electronic component 100 may be relieved and the capacitance forming portion Ac may be protected from cracks occurring during mounting. Accordingly, reliability of the multilayer electronic component 100 may be improved.

The content of N-doped polydopamine included in the dielectric layer 111 is not limited to any particular example. However, N-doped polydopamine may be included in the content in which CIE L* a* b* colorimetric value measured in the dielectric layer 111 satisfies 30<L*<34, −4<a*<−2 and −16<b*<−14. In the CIE L* a* b* colorimetric system, CIE stands for Commission Internationale de l'Eclairage, L* stands for lightness, and a* and b* stands for saturation. The CIE L* a* b* colorimetric value may vary depending on the content of N-doped polydopamine included in the dielectric layer 111.

The CIE L* a* b* colorimetric value may be measured by polishing the multilayer electronic component 100 to the central portion in the second direction, exposing the cross-sections in first and second direction, and measuring the central portion of the dielectric layer 111 disposed in the central portion of the capacitance forming portion Ac using a spectrophotometer (CM-700D, Konica). In this case, an average value may be obtained by measuring at three or more points spaced apart by an equal distance in the central portion of the dielectric layer 111 in the second direction.

In an example embodiment, N-doped polydopamine included in the dielectric layer 111 may have a plate-shaped structure. That is, N-doped polydopamine included in the dielectric layer 111 may have a two-dimensional structure. Accordingly, since toughness of the dielectric layer 111 is increased, cracks in the dielectric layer 111 may be prevented, and propagation of cracks to the capacitance forming portion Ac may be prevented even when cracks are already formed.

In an example embodiment, the dielectric layer may further include polymerized polydopamine. Here, polymerized polydopamine may refer to polydopamine polymer remaining unreacted in the process of forming N-doped polydopamine polymer while going through a firing process to form the body 110.

FIG. 6B is a two-axis graph showing a relationship between binding energy and spectral intensity by XPS analysis of a dielectric layer according to a comparative example. FIG. 6B is a two-axis graph showing a relationship between binding energy and spectral intensity by XPS analysis of a dielectric layer according to an embodiment. XPS analysis of the dielectric layer may be performed by polishing the multilayer electronic component 100 to the central portion in the second direction, exposing cross sections in the first and second directions, and performing XPS analysis of the central portion of the dielectric layer 111 disposed in the central portion of the capacitance forming portion Ac with K-alpha lines. In this case, an average value may be obtained by measuring at three or more points spaced apart by an equal distance in the central portion of the dielectric layer 111 in the second direction.

A method of determining whether the dielectric layer 111 includes N-doped polydopamine is not limited to any particular example. As an example, in the example embodiment, the presence of N-doped polydopamine may be determined by analyzing constituent elements, composition, and chemical bonding state of the dielectric layer 111 through X-ray photoelectron spectroscopy (XPS), but an example embodiment thereof is not limited thereto.

In the comparative example, the dielectric layer may not include N-doped polydopamine, and in the embodiment, the dielectric layer 111 may include N-doped polydopamine.

Referring to FIG. 6A, as a result of analyzing the dielectric layer of the comparative example by XPS, Ba3d5, O1s, Ti2p and C1s peaks were detected. Referring to FIG. 6B, as a result of XPS analysis of the dielectric layer 111 of the embodiment, N1s peaks were additionally detected in addition to Ba3d5, O1s, Ti2p, and C1s peaks. In the XPS analysis result, when both the C1s peak and the N1s peak were detected, it may be determined that N-doped polydopamine was present. In the example embodiment, K-alpha rays were used as X-rays, and the intensity in the range of 100 to 1000 eV was a comparison of arbitrary unit (a.u.) values.

In an example embodiment, the intensity of the N1s peak may have a maximum value at a binding energy of 395 eV or more and 405 eV or less, and the intensity of the C1s peak may have a maximum value at a binding energy of 280 eV or more and 290 eV or less.

FIG. 7A is a graph illustrating a result of analysis of deconvolution of an N1s peak in FIG. 6B. FIG. 7B is a graph illustrating a result of analysis of deconvolution of a C1s peak in FIG. 6B.

Referring to FIG. 7A, the N1s peaks in embodiment may be classified into peaks of primary amine (R—NH2), secondary amine (R—NH—R) and tertiary amine (R=N—R) through deconvolution. In this case, the binding energy of the primary amine (R—NH2) peak was 401.8 eV, the binding energy of the secondary amine (R—NH—R) peak was 399.8 eV, and the binding energy of the tertiary amine (R=N—R) peak was 398.5 eV.

Referring to FIG. 7B, the C1s peaks in the embodiment may be classified into C—C, C—N, C—O, and O—C=O peaks through deconvolution. In this case, the binding energy of the C—C peak was 284.6 eV, the binding energy of the C—N peak was 285.5 eV, the binding energy of the C—O peak was 286.4 eV, and the binding energy of the O—C=O peak was 288.5 eV.

FIG. 8A is a two-axis graph illustrating a relationship line between spectral intensity and a wave number by Raman spectrum analysis in a state before firing of a dielectric layer. FIG. 8B is a two-axis graph illustrating a relation line between spectral intensity and a wave number by Raman spectrum analysis in a state after firing a dielectric layer. Raman spectrum analysis of the dielectric layer was performed by polishing the multilayer electronic component 100 to the central portion in the second direction, exposing the cross-sections in first and second directions, and measuring the central portion of the dielectric layer 111 disposed in the central portion of the capacitance forming portion Ac using LabRAM HR Evolution Visible_NIR (HORIBA) of 514 nm laser. In this case, the average value may be taken by measuring at three or more points spaced apart by an equal distance in the second direction in the central portion of the dielectric layer 111, the wave number (cm-1) of the Raman shift was in the range of 1000 to 2000 cm-1, and the intensity was a comparison of arbitrary unit (a.u.) values.

Referring to FIG. 8A, the open shape of the two-axis graph indicating the relationship line between spectral intensity and a wave number by Raman spectrum analysis of the dielectric layer before firing was not clear and three or more peaks were formed.

Referring to FIG. 8B, in an embodiment, in the two-axis graph indicating the relation line between spectral intensity and wave number by Raman spectrum analysis of the dielectric layer 111 in an embodiment, which is the dielectric layer after firing, a primary peak (D peak) having a wave number of 1361 cm$^{-1}$ or more and 1380 cm$^{-1}$ or less and a secondary peak (G peak) having a wave number of 1611 cm$^{-1}$ or more and 1630 cm$^{-1}$ or less were detected. In an embodiment, the full width at half maximum of the primary peak may be preferably 80 cm$^{-1}$ or more and 90 cm$^{-1}$ or less, and the full width at half maximum of the secondary peak may be 100 cm$^{-1}$ or more and 110 cm$^{-1}$ or less preferably. Accordingly, it may be confirmed that N-doped polydopamine was formed in the dielectric layer 111 of the multilayer electronic component 100. Meanwhile, it may be confirmed that the open shape of the graph in FIG. 8B is a smoother curve shape than that of the open shape of the graph in FIG. 8A. Accordingly, it may be confirmed that at least a portion of N-doped polydopamine included in the dielectric layer 111 of the multilayer electronic component 100 had a two-dimensional plate-shaped structure.

In an example embodiment, the dielectric layer 111 may further include polyvinyl butyral (PVB). Polyvinyl butyral may be a copolymer having acetal, acetyl and hydroxyl groups. As in an example embodiment, when polyvinyl butyral is included in the dielectric layer 111, strength of the dielectric layer 111 may be improved through a hydrogen bond with N-doped polydopamine included in the dielectric layer 111.

FIG. 10 is a cross-sectional diagram illustrating a multilayer electronic component taken in first and third directions according to an example embodiment Referring to FIG. 10, the internal electrodes 121 and 122 may include a dielectric layer 111 and first and second internal electrodes 121 and 122 alternately disposed in a first direction, and the body 110 may include a capacitance forming portion Ac in which the first and second internal electrodes 121 and 122 overlap in a first direction and forming capacitance, and margin portions 114 and 115 disposed on one side and the other side of the capacitance forming portion Ac in the third direction. The margin portions 114 and 115 may include polydopamine.

To prevent a step difference due to the internal electrodes 121 and 122, when margin portion 114 and 115 is formed by, after laminating, cutting out the internal electrodes to expose the fifth and sixth surfaces 5 and 6 of the body, and laminating a single dielectric layer or two or more dielectric layers on both side surfaces of the capacitance forming portion Ac in the third direction (width direction), a gap may be formed due to a decrease in adhesive strength between the capacitance forming portion Ac and the margin portions 114 and 115, and such a gap may cause a decrease in reliability of the multilayer electronic component 100. As in an example embodiment, when the margin portions 114 and 115 include polydopamine, adhesion between the margin portions 114 and 115 and the capacitance forming portion Ac may be improved, and the gaps may be prevented, such that reliability of the multilayer electronic component 100 may be improved.

Referring to FIG. 10, in an example embodiment, adhesive portions 116 and 117 may be disposed between the margin portions 114 and 115 and the capacitance forming portion Ac, and the adhesive portions 116 and 117 may include polydopamine. The adhesive portions 116 and 117 may be disposed between the capacitance forming portion Ac and the margin portions 114 and 115 such that the capacitance forming portion Ac and the margin portions 114 and 115 may be firmly bonded to each other. In this case, when polydopamine is included in the adhesive portions 116 and 117, the dielectric layer 111 including N-doped polydopamine, the margin portions 114 and 115 including polydopamine, and the adhesive portions 116 and 117 including polydopamine may be strongly bonded to each other, such that mechanical strength and reliability of the multilayer electronic component 100 may be improved.

In an example embodiment, the polydopamine included in the margin portion 114 and 115 or the adhesive portion 116 and 117 may be N-doped polydopamine, and the margin portion 114 and 115 or the adhesive portion 116 and 117 may include N-doped polydopamine with a plate-shaped structure. The above descriptions of the material related to the dielectric layer 111 may be equally applied to the material related to the margin portion 114 and 115 or the adhesive portion 116 and 117. Thus, overlapped descriptions are omitted.

Embodiment

FIG. 9A is a graph illustrating result of comparing adhesive forces of a dielectric layer according to a comparative example and an embodiment. FIG. 9B is a graph illustrating results of comparing an elastic modulus of a dielectric layer according to a comparative example and an embodiment.

The graph in FIG. 9A or 9B indicates the result of 10 multilayer electronic component samples, and the adhesive force of the dielectric layer was measured under conditions of a load of 50 mN and a depth of 500 nm by nanoindentation (iNano Nanoindenter, KLA-Tencor). The elastic modulus of the dielectric layer was performed in AFM (XE-100, Park system) contact mode. The conditions were 10 random positions and a force limit of 10 nN. The adhesive force was measured through the F-D curve by coating the cantilever tip and the substrate with the same dielectric layer.

In the comparative example in FIGS. 9A and 9B, the dielectric layer 111 did not include N-doped polydopamine, and in the embodiment, the dielectric layer 111 included N-doped polydopamine. Referring to FIGS. 9A and 9B, the embodiment in which the dielectric layer 111 included N-doped polydopamine had adhesive force and elastic modulus higher than those of the comparative example in which the dielectric layer 111 did not include N-doped polydopamine. Specifically, as for the dielectric layer 111 in the embodiment, the adhesive force had an average value of 16.53 (gf) and a range of greater than 16.08 (gf) and less than 18.32 (gf), whereas the dielectric layer 111 in the comparative example, the adhesive force had an average value of 10.10 (gf) and a range of more than 13.09 (gf) and less than 15.81 (gf). Also, the elastic modulus of the dielectric layer 111 in the embodiment had an average value of 16.79 Mpa and a range of greater than 14.03 Mpa and less than 19.36 Mpa, whereas the elastic modulus of the dielectric layer 111 in the comparative example had an average value of 14.39 Mpa and a range of greater than 7.37 Mpa and less than 12.85 Mpa.

Table 1 below lists the result of performing composite reliability test on 40 multilayer electronic component samples as a comparative example and 40 multilayer electronic component samples as an embodiment. In the comparative example, the dielectric layer 111 did not include N-doped polydopamine, and in an embodiment, the dielectric layer 111 included a N-doped polydopamine, and other components were substantially the same.

The composite reliability test was performed on the entirety of samples by step 1 (40° C., 4.8V, 1 hr), step 2 (85° C., 4.8V, 1 hr) and step 3 (85° C., 2.8V, 65% relative humidity, 2 hr) in order, and the samples in which the insulation resistance value fell below 107 from step 1 to step 3 were assessed as defective.

TABLE 1

| Step (hr) | Comparative example (number of defects/number of samples) | Embodiment (number of defects/number of samples) |
|---|---|---|
| Step 1 (0~1 hr) | 1/40 | 0/40 |
| Step 2 (1 hr~2 hr) | 1/40 | 0/40 |
| Step 3 (2 hr~4 hr) | 3/40 | 0/40 |

In the comparative example, it was confirmed that insulation resistance deterioration occurred in a portion of samples during the composite reliability test, and in the embodiment, even when step 1 to step 3 were applied in sequence, insulation resistance did not deteriorate. That is, it may be confirmed that the multilayer electronic component 100 in an example embodiment in which the dielectric layer 111 may include N-doped polydopamine had further improved moisture resistance and high-temperature reliability than in the example in which the dielectric layer did not include N-doped polydopamine.

According to the aforementioned example embodiments, as the dielectric layer of a multilayer electronic component includes N-doped polydopamine, heat and pressure applied during compression and lamination processes may be reduced.

Also, as the dielectric layer of the multilayer electronic component includes N-doped polydopamine, the modulus of the dielectric layer may be improved.

Also, as the dielectric layer of the multilayer electronic component includes N-doped polydopamine, toughness of the dielectric layer may be improved.

Also, reliability of a multilayer electronic component may be improved through the above-described effects.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
a body including a dielectric layer and internal electrodes alternately disposed with the dielectric layer; and
external electrodes disposed on the body,
wherein the dielectric layer includes N-doped polydopamine,
wherein, in a two-axis graph indicating a relationship between binding energy and spectral intensity by XPS analysis, N1s peak and C1s peak are detected in the dielectric layer, and
wherein, in a two-axis graph indicating a relationship line between spectral intensity and wave number by Raman spectrum analysis, a primary peak having a wave number of 1361 cm$^{-1}$ or more and 1380 cm$^{-1}$ or less and a secondary peak having a wave number of 1611 cm$^{-1}$ or more and 1630 cm$^{-1}$ or less are detected in the dielectric layer.

2. The multilayer electronic component of claim 1, wherein a CIE L* a* b* colorimetric value measured in the dielectric layer satisfies $30<L^*<34$, $-4<a^*<-2$ and $-16<b^*<-14$.

3. The multilayer electronic component of claim 1, wherein the N-doped polydopamine has a plate-shaped structure.

4. The multilayer electronic component of claim 1, wherein the dielectric layer further includes polymerized polydopamine.

5. The multilayer electronic component of claim 1, wherein intensity of the N1s peak has a maximum value at a binding energy of 395 eV or more and 405 eV or less, and intensity of the C1s peak has a maximum value at a binding energy of 280 eV or more and 290 eV or less.

6. The multilayer electronic component of claim 1, wherein a full width at half maximum of the primary peak is 80 cm$^{-1}$ or more and 90 cm$^{-1}$ or less, and a full width at half maximum of the secondary peak is 100 cm$^{-1}$ or more and 110 cm$^{-1}$ or less.

7. The multilayer electronic component of claim 1, wherein the dielectric layer further includes polyvinyl butyral.

8. The multilayer electronic component of claim 1, wherein the dielectric layer further includes oxide including Ba and Ti.

9. The multilayer electronic component of claim 1, wherein an average thickness of the dielectric layer is 0.35 μm or less.

10. The multilayer electronic component of claim 1,
wherein the internal electrode includes first and second internal electrodes alternately disposed with the dielectric layer in a first direction,
wherein the body includes first and second surfaces opposing in the first direction, third and fourth surfaces connected to the first and second surfaces and opposing in a second direction, and fifth and sixth surfaces connected to the first to fourth surfaces and opposing in a third direction, and further includes a capacitance forming portion in which the first and second internal electrodes overlap each other in the first direction and form capacitance, and a margin portion disposed on one surface and the other surface of the capacitance forming portion in the third direction, and
wherein the margin portion includes polydopamine.

11. The multilayer electronic component of claim 10,
wherein an adhesive portion is disposed between the margin portion and the capacitance forming portion, and
wherein the adhesive portion includes polydopamine.

12. A multilayer electronic component, comprising:
a body comprising a dielectric layer and first and second internal electrodes with the dielectric layer therebetween in a first direction, including first and second surfaces opposing in the first direction, third and fourth surfaces connected to the first and second surfaces and opposing in a second direction, and fifth and sixth surfaces connected to the first to fourth surfaces and opposing in a third direction, and further comprising a capacitance forming portion in which the first and second internal electrodes overlap each other in the first direction and form capacitance, and a margin portion disposed on one surface and the other surface of the capacitance forming portion in the third direction; and
first and second external electrodes disposed on the body to connect to the first and second internal electrodes, respectively,
wherein the margin portion includes N-doped polydopamine,
wherein, in a two-axis graph indicating a relationship between binding energy and spectral intensity by XPS analysis, N1s peak and C1s peak are detected in the margin portion, and
wherein, in a two-axis graph indicating a relationship line between spectral intensity and wave number by Raman spectrum analysis, a primary peak having a wave number of 1361 cm$^{-1}$ or more and 1380 cm$^{-1}$ or less and a secondary peak having a wave number of 1611 cm$^{-1}$ or more and 1630 cm$^{-1}$ or less are detected in the margin portion.

13. The multilayer electronic component of claim 12, wherein the N-doped polydopamine has a plate-shaped structure.

14. The multilayer electronic component of claim 12, wherein the margin portion further includes polymerized polydopamine.

15. The multilayer electronic component of claim 12, wherein the body further comprises an adhesive portion disposed between the margin portion and the capacitance forming portion and including polydopamine.

16. The multilayer electronic component of claim 12, wherein a CIE L* a* b* colorimetric value measured in the margin portion satisfies 30<L*<34, −4<a*<−2 and −16<b*<−14.

17. The multilayer electronic component of claim 12, wherein the margin portion further includes polyvinyl butyral.

*   *   *   *   *